United States Patent
Pang et al.

(10) Patent No.: US 9,661,234 B2
(45) Date of Patent: May 23, 2017

(54) IMAGE PROCESSING METHOD AND IMAGE PROCESSING SYSTEM ASSIGNING DIFFERENT GAINS TO DIFFERENT SECTIONS

(71) Applicant: PixArt Imaging (Penang) SDN. BHD., Penang (MY)

(72) Inventors: Kwai-Lee Pang, Penang (MY); Swee-Lin Thor, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 3 days.

(21) Appl. No.: 14/801,083

(22) Filed: Jul. 16, 2015

(65) Prior Publication Data

US 2017/0019576 A1    Jan. 19, 2017

(51) Int. Cl.
*H04N 3/14*      (2006.01)
*H04N 5/335*     (2011.01)
*H04N 5/235*     (2006.01)
*H04N 5/232*     (2006.01)
*H04N 5/243*     (2006.01)

(52) U.S. Cl.
CPC ......... *H04N 5/2353* (2013.01); *H04N 5/2351* (2013.01); *H04N 5/23229* (2013.01); *H04N 5/243* (2013.01)

(58) Field of Classification Search
CPC .... H04N 5/2353; H04N 5/243; H04N 5/2351; H04N 5/23229

USPC .......... 348/224.1–228.1, 362, 241, 243, 239
See application file for complete search history.

(56) References Cited

U.S. PATENT DOCUMENTS

| | | | | |
|---|---|---|---|---|
| 4,409,472 A | * | 10/1983 | Kimura | H04N 5/2352 250/201.1 |
| 6,219,468 B1 | * | 4/2001 | Yukawa | G02B 7/34 348/311 |
| 7,088,975 B1 | * | 8/2006 | Gomez | H03F 1/26 330/124 R |
| 8,541,728 B1 | * | 9/2013 | Xu | G01J 1/18 250/205 |

* cited by examiner

*Primary Examiner* — Yogesh Aggarwal
(74) *Attorney, Agent, or Firm* — Tung & Associates

(57) ABSTRACT

The present invention discloses an image processing method and an image processing system adopting the same. The method includes the steps of: (a) obtaining a pixel array representing an image; (b) segmenting the pixel array into two or more non-overlapping regions; (c) identifying a capacitor discharging rate of each of the regions; (d) generating a pulse width modulation (PWM) signal when a voltage level dropping of a capacitor exceeds a predetermined threshold; and (e) applying exposure parameters to the regions according to the capacitor discharging rate of the regions, respectively, wherein the exposure parameter applied to one of the regions is different from the exposure parameter applied to at least another one of the regions.

5 Claims, 7 Drawing Sheets

IMAGE PROCESSING METHOD AND IMAGE PROCESSING SYSTEM ASSIGNING DIFFERENT GAINS TO DIFFERENT SECTIONS

BACKGROUND OF THE INVENTION

Field of Invention

The present invention relates to an image processing method and an image processing system; particularly, it relates to such image processing method and image processing system capable of assigning different gains to different pixel array sections.

Description of Related Art

Please refer to FIG. 1, which shows a block diagram of a conventional image processing system. The image processing system 10 comprises an image sensor 19 and a processor 13. The image sensor 19 includes a pixel array 11 and an automatic gain control (AGC) unit 12. In an enable phase TAVG_EN, the processor 13 provides an enable signal TAVG_EN to the pixel array 11 and the AGC unit 12, whereby the pixel array 11 generates background determination signals S-VRST and S-VRSTD and the AGC unit 12 generates a PWM signal TAVG according to the signals S-VRST and S-VRSTD, to determine a background illumination level which for example relates to an ambient light intensity; the functions of the signals S-VRST, S-VRSTD and TAVG will be explained later with reference to FIGS. 2 and 3. In a shutter phase, the processor 13 provides a shutter signal SHU to control the timing and duration in which the pixel array 11 is exposed by light emitted from a light source 1 and reflected by an object (not shown), whereby the pixel array 11 generates an image signal (not shown) according to an image of the object. The processor 13 also provides a lighting control signal L_Ctl to control the light source 1 such that the light source 1 emits light at designated timings.

FIG. 2 shows a pixel circuit of one pixel unit. As shown in FIG. 2, a pixel unit includes a photo current generator 110 which generates a current I in response to light, a capacitor 111, a TAVG_EN PMOS switch 117 for pull up, and a shutter switch 118. The photo current generator 110 is for example as shown, including a BJT (bipolar junction transistor) 115 which generates the current I in response to light, a current source 112, and MOS transistors 113 and 116 to bias the base voltage of the BJT and acts as common gate respectively.

FIG. 3 shows waveforms of the signals shown in FIG. 1. Please refer to FIGS. 2-3 in conjugation with FIG. 1. Before the enable phase TAVG_EN (low state), the enable signal TAVG_EN closes the PMOS switch 117, and the node VRST is pulled to a level corresponding to the voltage supply VDDA, which is the background determination signal S-VRSTD. In the enable phase TAVG_EN, the enable signal TAVG_EN opens the PMOS switch 117, and the capacitor 111 discharges, until the voltage across the capacitor 111 drops a predetermined level V_threshold, and this dropping waveform is the background determination signal S-VRST. The timing when the background determination signal S-VRST drops the level V_threshold (i.e., when the background determination signal S-VRST reaches a level which is equal to S-VRSTD minus V_threshold) determines the PWM signal TAVG. The PWM signal TAVG can be regarded as a gain control signal. Based on the information of the PWM signal TAVG, the processor 13 determines the pulse width of the shutter signal SHU.

The pixel array 11 includes multiple pixel units. Conventionally, the gain control signal provided by the AGC unit 12 is the same for every pixel unit in the pixel array 11.

However, the pixel array 11 may not be uniformly illuminated under certain circumstances, and because the PWM signal TAVG and the signal SHU is the same for every pixel unit in the pixel array 11, this prior art cannot obtain complete and sufficient information of the pixel array 11 because certain pixel units may be underexposed or overexposed.

In view of the above, to overcome the drawback in the prior art, the present invention proposes an image processing method and image processing system capable of assigning different gains to different pixel array sections.

SUMMARY OF THE INVENTION

From one perspective, the present invention provides an image processing system, comprising: a pixel array segmented into a plurality of non-overlapping regions, wherein during a reset phase for determining a background illumination level, each non-overlapping region generates respective background determination signals; a plurality of AGC units, each AGC unit generating a respective gain control signal for a corresponding one of the non-overlapping regions according to the respective background determination signals of the corresponding non-overlapping region; and a processor for generating a same shutter signal in a shutter phase to control exposure durations of both or all the non-overlapping regions according to the gain control signal of one AGC unit, or for generating respective shutter signals in the shutter phase to control exposure durations of the non-overlapping regions respectively according to the gain control signals of the AGC units.

In one embodiment, each non-overlapping region includes a capacitor which is pulled to a voltage level before the enable phase and discharges until a predetermined level drop during the enable phase, and wherein the background determination signals include voltage signals generated by the capacitor which indicate the voltage level and the timing reaching the predetermined level drop.

In one embodiment, the image processing system further comprises unifying switches connecting the voltage signals generated by the capacitors of two or more of the non-overlapping regions, wherein when the processor generates a same shutter signal to control exposure durations of both or all the non-overlapping regions according to the gain control signal of one AGC unit, the unifying switches short the voltage signals generated by the capacitors of the two or more non-overlapping regions.

In one embodiment, during the enable phase, the capacitor of one of the non-overlapping regions discharges relatively faster and the capacitor of another one of the non-overlapping regions discharges relatively slower, and during the shutter phase, the processor generates a shutter signal having a relatively shorter pulse width for the non-overlapping region whose capacitor discharges relatively faster and generates a shutter signal having a relatively longer pulse width for the non-overlapping region whose capacitor discharges relatively slower.

From another perspective, the present invention provides an image processing method, comprising the steps of: segmenting a pixel array into a plurality of non-overlapping regions; during an enable phase for determining a background illumination level, each non-overlapping region generating respective background determination signals; generating a respective gain control signal for a corresponding one of the non-overlapping regions according to the respective background determination signals of the corresponding non-overlapping region; and generating respective shutter signals having respective pulse widths in a shutter phase to control exposure durations of the non-overlapping regions respectively according to the gain control signals.

In one embodiment, each non-overlapping region includes a capacitor which is pulled to a voltage level before the enable phase and discharges until a predetermined level drop during the enable phase, and wherein the background determination signals include voltage signals generated by the capacitor which indicate the voltage level and the timing reaching the predetermined level drop.

In one embodiment, during the enable phase, the capacitor of one of the non-overlapping regions discharges relatively faster and the capacitor of another one of the non-overlapping regions discharges relatively slower, and during the shutter phase, the step of generating respective shutter signals having respective pulse widths generates a shutter signal having a relatively shorter pulse width for the non-overlapping region whose capacitor discharges relatively faster and generates a shutter signal having a relatively longer pulse width for the non-overlapping region whose capacitor discharges relatively slower The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be better understood with regard to the detailed description of the embodiments below, with reference to the drawings. The drawings as referred to throughout the description of the present invention are for illustration only, but not drawn according to actual scale.

Figure 4:
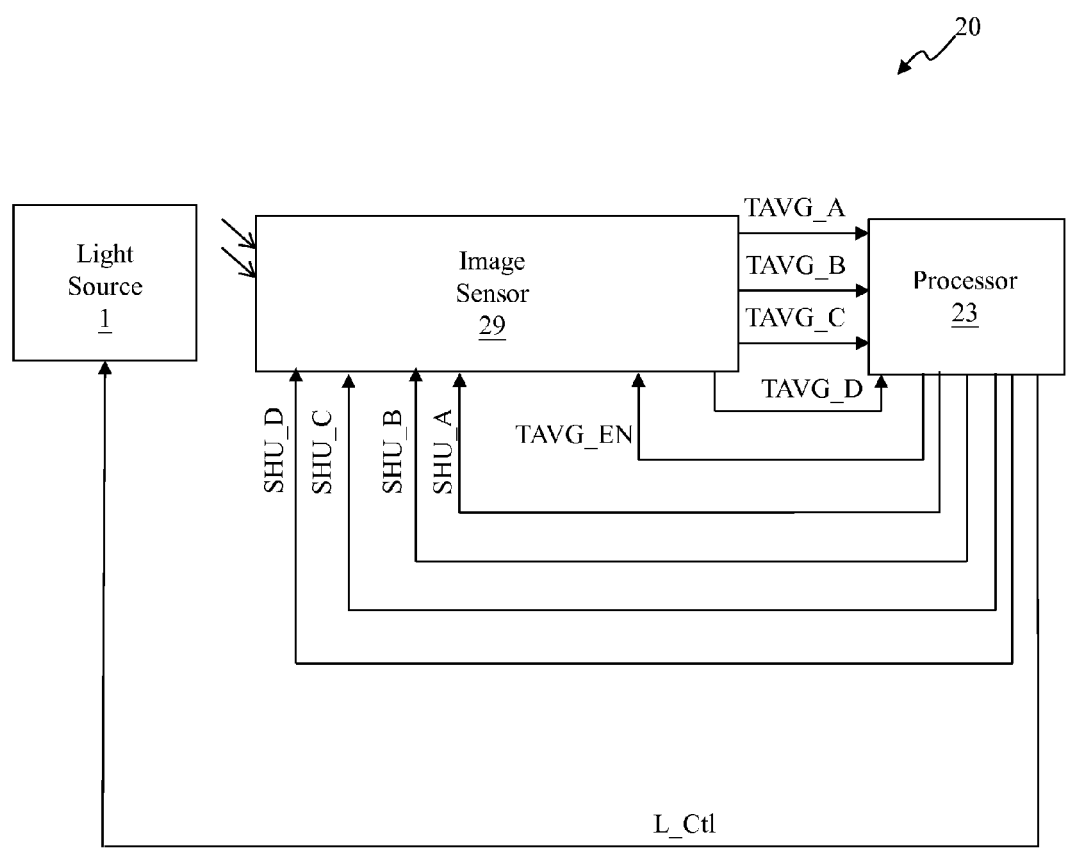
FIG. 4 shows a block diagram of an image processing system according to an embodiment of the present invention.
Figure 5:
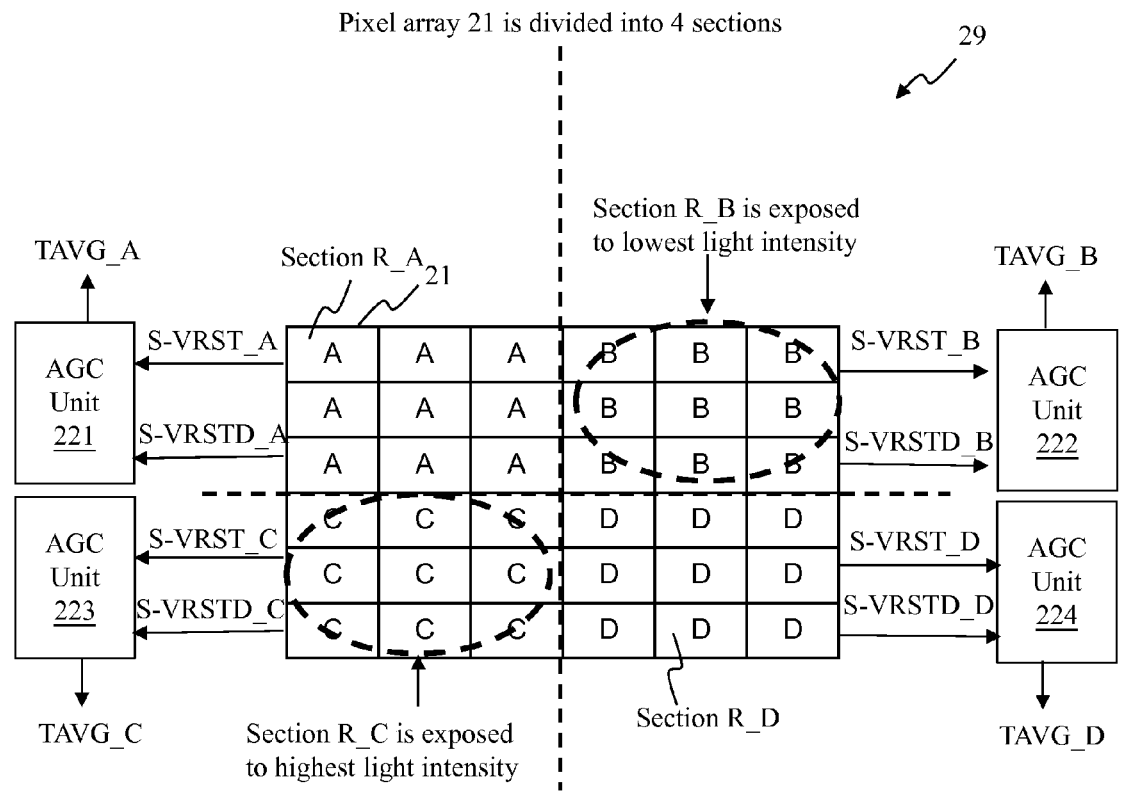
FIG. 5 shows an embodiment as to how the pixel array of the image sensor is segmented into four non-overlapping regions, in which different regions are exposed by different shutter pulse widths.
Figure 6:
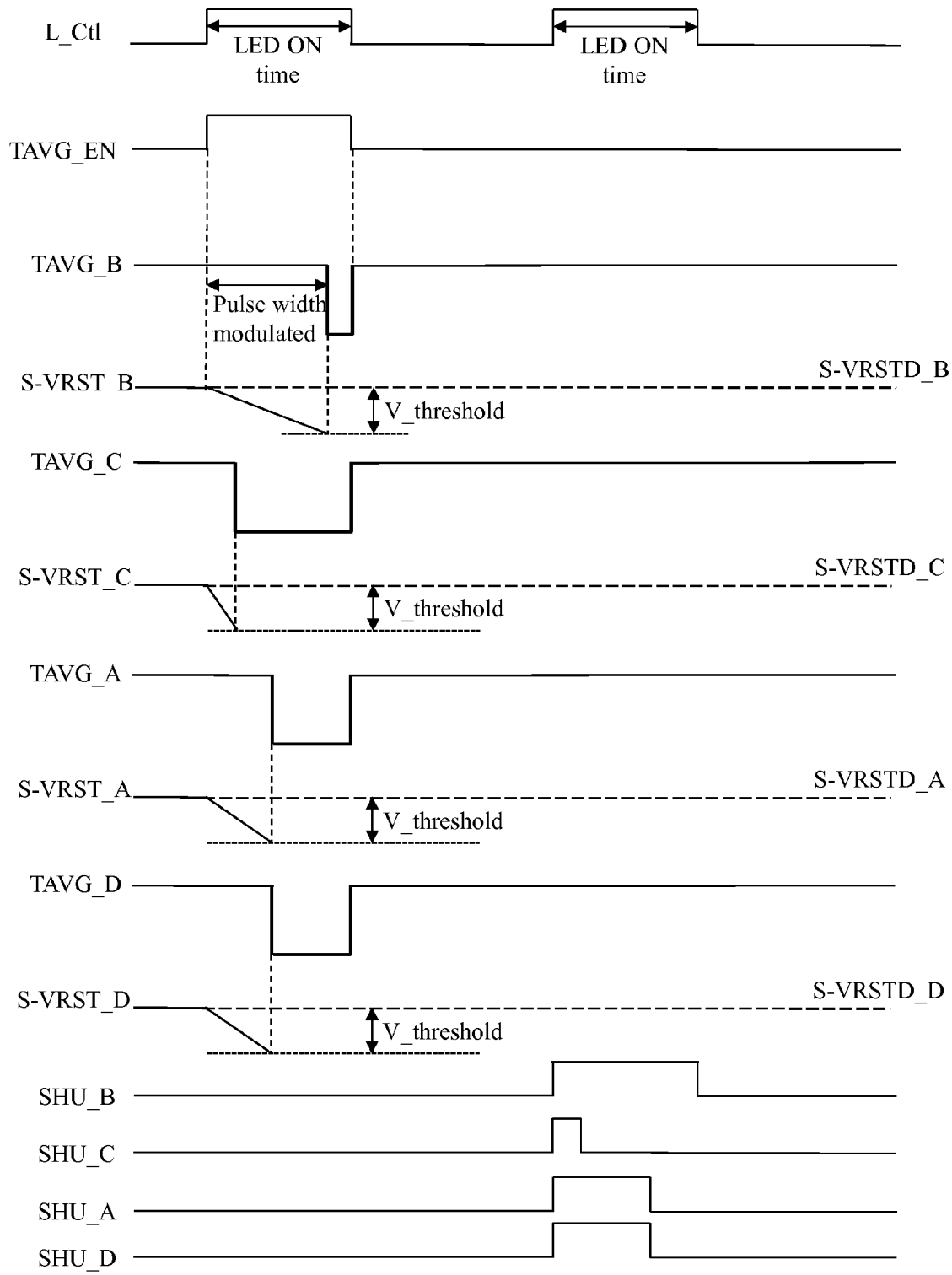
FIG. 6 shows waveforms of different signal shown in FIG. 4.

Please refer to FIGS. 4-6. FIG. 4 shows a block diagram of an image processing system according to an embodiment of the present invention. FIG. 5 shows an embodiment as to how the pixel array of the image sensor is segmented into four non-overlapping regions, in which different regions are exposed by different shutter signals having the same or different pulse widths. FIG. 6 shows waveforms of different signals shown in FIG. 4.

As shown in FIG. 4, the image processing system 20 of this embodiment comprises an image sensor 29 and a processor 23. A light source 1 emits light at timings controlled by the light control signal L_Ctl provided by the processor 23. The image sensor 29 is capable of generating multiple gain control signals TAVG_A~TAVG_D according to different ambient light intensities perceived by different pixel regions, and the processor 23 generates multiple shutter signals SHU_A~SHU_D in response to the multiple gain control signals TAVG_A~TAVG_D to respectively control the different pixel regions.

More specifically, referring to FIG. 5, the image sensor 29 includes a pixel array 21 segmented into four non-overlapping regions Region R_A~R_D and four AGC units 221-224. The number of the regions is shown to be four as an example. In other embodiments, the number of the regions may be varied as a matter of design choice. Besides, in the embodiment of FIG. 5, all the regions R_A~R_D are rectangular and all four regions R_A~R_D have the same area size. This is only one non-limiting embodiment of the present invention. In other embodiments, the pixel array 21 can be segmented by any other ways wherein the regions can have the same or different shapes, the same or different area sizes, and located by any layout.

During the enable phase for determining the background illumination level, each region R_A~R_D of the pixel array 21 can generate respective background determination signals (i.e., S-VRST_A and S-VRSTD_A by region R_A, S-VRST_B and S-VRSTD_B by region R_B, S-VRST_C and S-VRSTD_C by region R_C, and S-VRST_D and S-VRSTD_D by region R_D), so that each AGC unit 221-224 receives corresponding background determination signals from a corresponding region. That is, the AGC unit 221 receives the background determination signals S-VRST_A and S-VRSTD_A from the region R_A; the AGC unit 222 receives the background determination signals S-VRST_B and S-VRSTD_B from the region R_B; the AGC unit 223 receives the S-VRST_C and S-VRSTD_C from the region R_C; the AGC unit 224 receives the background determination signals S-VRST_D and S-VRSTD_D from the region R_D.

In the example shown in FIG. 5, the pixel array 21 is not uniformly illuminated, wherein the region R_B is exposed to a lowest light intensity; the region R_C is exposed to a highest light intensity; the region R_A and R_D are exposed to an intermediate light intensity which is between the lowest light intensity and the highest light intensity.

Please refer to FIG. 5 in conjugation with FIG. 6. The region R_B is exposed to a lowest light intensity, so the region R_B has a slowest capacitor discharging rate (referring to the waveform of the signal S-VRST_B). Hence, the width of the gain control signal TAVG_B is the longest among the four gain control signals TAVG_A~TAVG_D. Accordingly, the processor 13 outputs a shutter signal SHU_B having a longest pulse width so that the region R_B is exposed by a longest duration.

In contrast, the region R_C is exposed to a highest light intensity, so the region R_C has a fastest capacitor discharging rate (referring to the waveform of the signal S-VRST_C). Hence, the width of the gain control signal TAVG_C is the shortest among the four gain control signals TAVG_A~TAVG_D. Accordingly, the processor 13 outputs a shutter signal SHU_C having a shortest pulse width so that the region R_C is exposed by a shortest duration.

The regions R_A and R_D are exposed to an intermediate light intensity, so the regions R_A and R_D have an intermediate capacitor discharging rate (referring to the waveforms of the signals S-VRST_A and S-VRST_D). Hence, the width of the gain control signal TAVG_A and the width of the gain control signal TAVG_D are intermediate, between the width of the gain control signal TAVG_B and the width of the gain control signal TAVG_C. Accordingly, the processor 13 outputs shutter signals SHU_A and SHU_D having an intermediate pulse width.

Note that, in this embodiment, the regions R_A and R_D receive the same light intensities, so the pulse width of the signal SHU_A and the pulse width of the signal SHU_D are the same. In another embodiment, the shutter pulse width of the signal SHU_A and the shutter pulse width of the signal SHU_D may be different.

Note that, although the embodiment shown by FIG. 5 discloses three different exposure parameters (i.e., shutter pulse widths) applied to four regions R_A~R_D, the present invention is not limited to this arrangement. The present invention only requires at least two different shutter pulse widths applied to at least two different regions. The minimum requirement is that the shutter pulse width applied to one of the regions is different from the shutter pulse width applied to at least another one of the regions. A region other than these two regions can use a shutter pulse width which is the same as or different from the shutter pulse width of one of the two regions.

Figure 1:
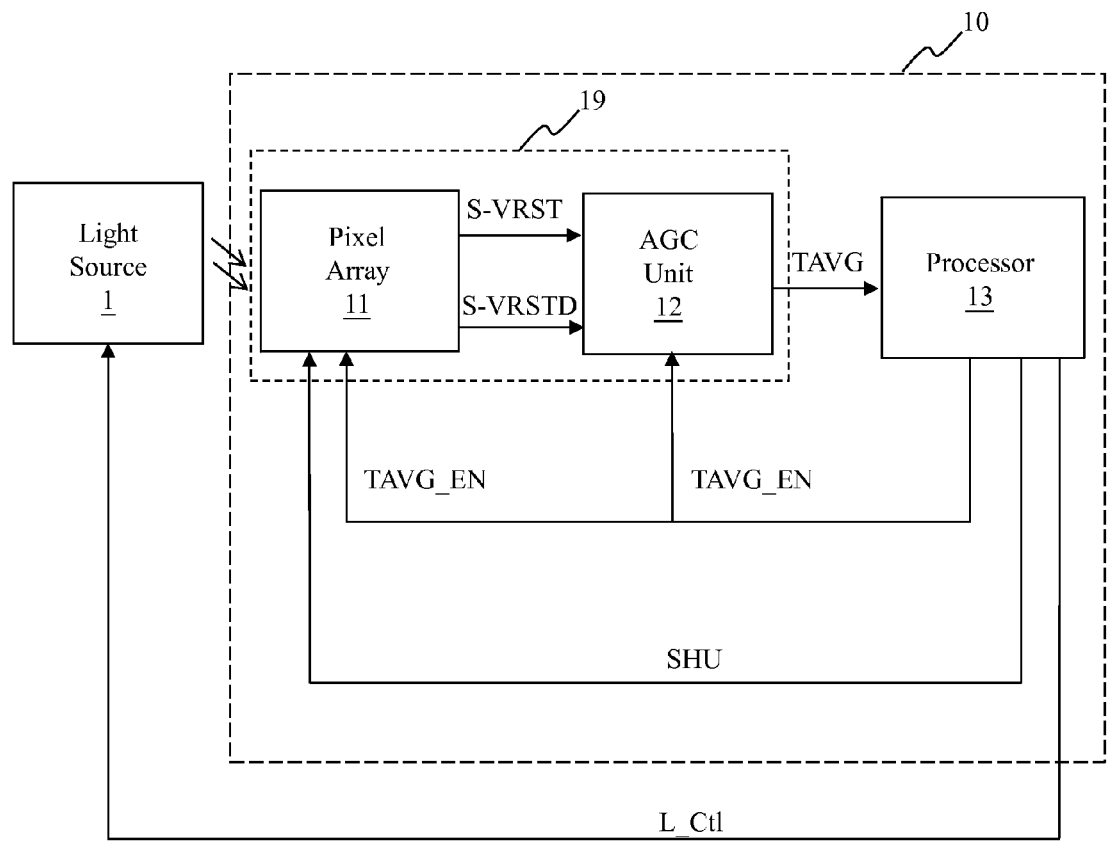
FIG. 1 shows a block diagram of a conventional image processing system.
Figure 2:
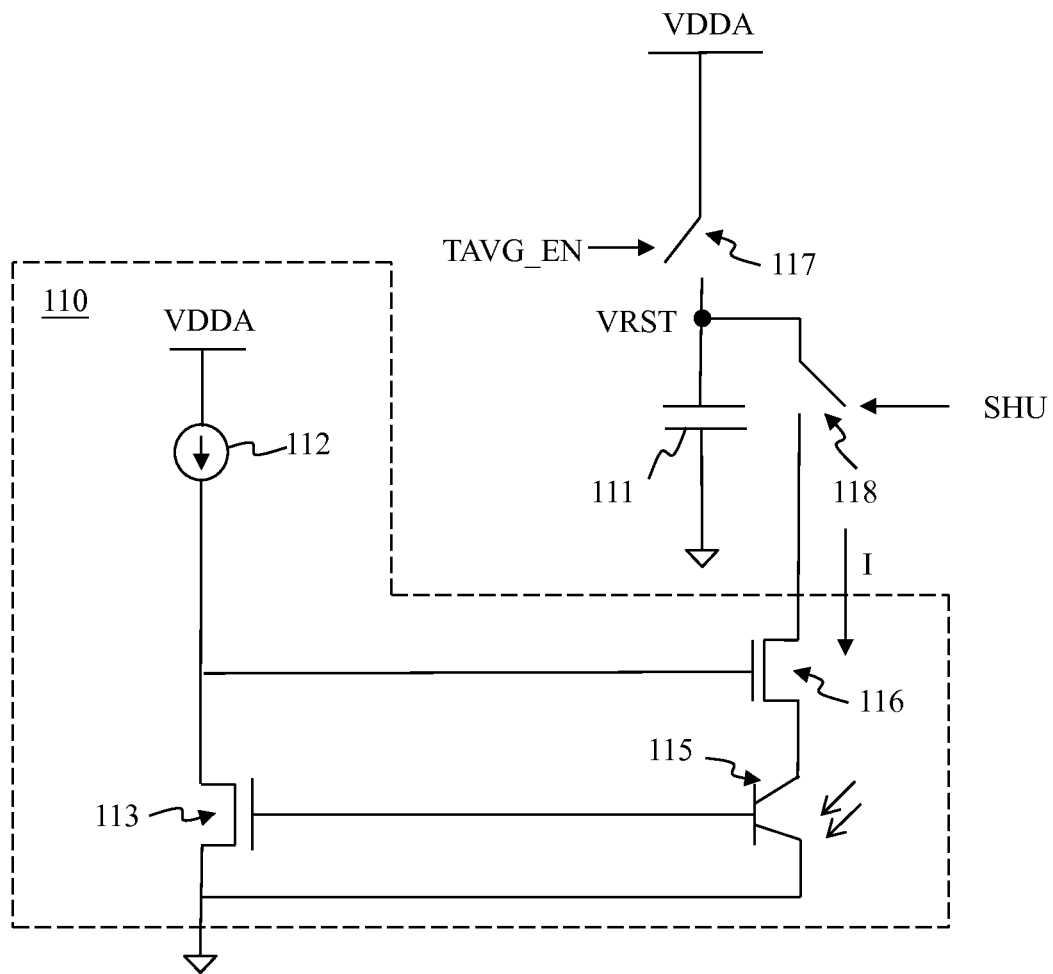
FIG. 2 shows a pixel circuit of one pixel unit.
Figure 3:
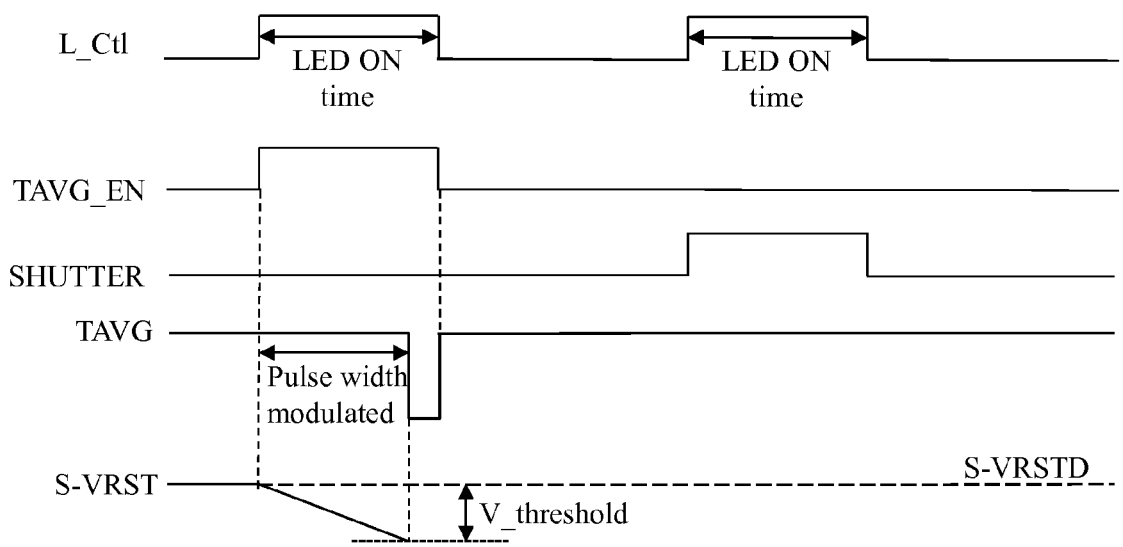
FIG. 3 shows waveforms of different signals shown in FIG. 1.

As compared to the prior art shown in FIGS. 1-3 wherein the whole pixel array 11 is taken as one region, the present invention can obtain better information of the non-uniformly illuminated pixel array 21.

In one embodiment, the above-mentioned image processing system 20 is applied to gesture recognition; in another embodiment, the above-mentioned image processing system 20 is applied to ambient light sensing or color image sensing.

Figure 7:
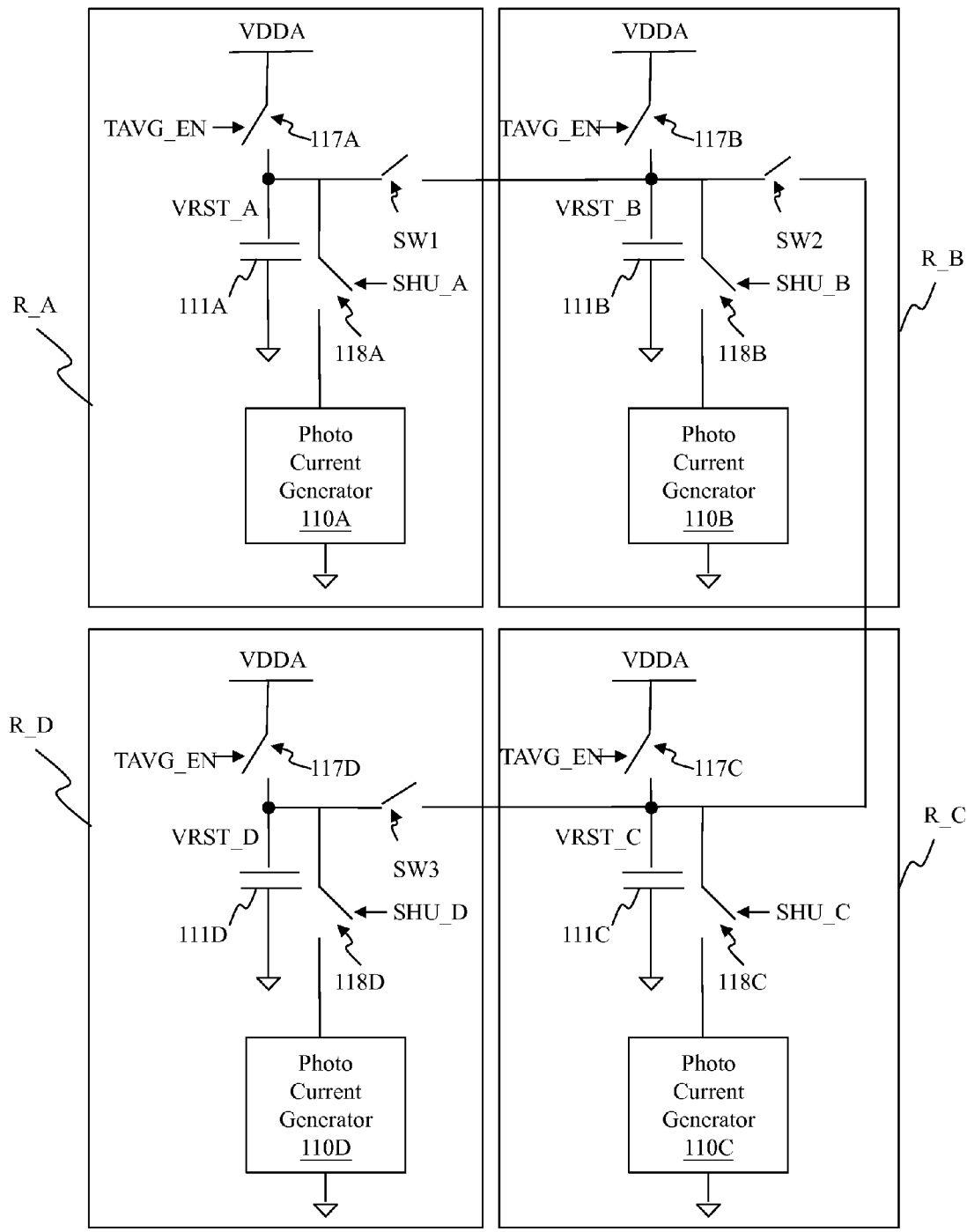
FIG. 7 shows how capacitors in each pixel region are shorted via switches, so that the image processing system is reverted to a single-gain structure.

Please refer to FIG. 7, wherein for simplicity of the drawing, only one pixel unit in each region is shown. In one embodiment, a switch SW1 can be provided to connect the nodes VRST_A and the nodes VRST_B; a switch SW2 can be can be provided to connect the nodes VRST_B and the nodes VRST_C; and a switch SW3 can be can be provided to connect the nodes VRST_C and the nodes VRST_D. When the switches SW1-SW3 are all closed, the image processing system 20 can be reverted to a single-gain structure. This embodiment provides the flexibility that the same circuit can be used for sectional pixel array analysis (e.g. for gesture recognition) or for whole array analysis (e.g. for light sensing or color image sensing).

The present invention has been described in considerable detail with reference to certain preferred embodiments thereof. It should be understood that the description is for illustrative purpose, not for limiting the scope of the present invention; for example, the colors of the pixels are not limited to green, red and blue. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. An image processing system, comprising:
a pixel array segmented into a plurality of non-overlapping regions, wherein during an enable phase for determining a background illumination level, each non-overlapping region generates respective background determination signals;
a plurality of automatic gain control (AGC) units, each AGC unit generating a respective gain control signal for a corresponding one of the non-overlapping regions according to the respective background determination signals of the corresponding non-overlapping region; and
a processor for generating a same shutter signal having a same pulse width in a shutter phase to control exposure durations of both or all the non-overlapping regions according to the gain control signal of one AGC unit, or for generating respective shutter signals having respective pulse widths in the shutter phase to control exposure durations of the non-overlapping regions respectively according to the gain control signals of the AGC units;
wherein each non-overlapping region includes a capacitor which is pulled to a voltage level before the enable phase and discharges until a predetermined level drop during the enable phase, and wherein the background determination signals include voltage signals generated by the capacitor which indicate the voltage level and the timing reaching the predetermined level drop.

2. The image processing system of claim 1, further comprising unifying switches connecting the voltage signals generated by the capacitors of two or more of the non-overlapping regions, wherein when the processor generates a same shutter signal to control exposure durations of both or all the non-overlapping regions according to the gain control signal of one AGC unit, the unifying switches short the voltage signals generated by the capacitors of the two or more non-overlapping regions.

3. The image processing system of claim 1, wherein during the enable phase, the capacitor of one of the non-overlapping regions discharges relatively faster and the capacitor of another one of the non-overlapping regions discharges relatively slower, and during the shutter phase, the processor generates a shutter signal having a relatively shorter pulse width for the non-overlapping region whose capacitor discharges relatively faster and generates a shutter signal having a relatively longer pulse width for the non-overlapping region whose capacitor discharges relatively slower.

4. An image processing method, comprising the steps of:
segmenting a pixel array into a plurality of non-overlapping regions;
during an enable phase for determining a background illumination level, each non-overlapping region generating respective background determination signals;
wherein each non-overlapping region includes a capacitor which is pulled to a voltage level before the enable phase and discharges until a predetermined level drop during the enable phase, and wherein the background determination signals include voltage signals generated by the capacitor which indicate the voltage level and the timing reaching the predetermined level drop;
generating a respective gain control signal for a corresponding one of the non-overlapping regions according to the respective background determination signals of the corresponding non-overlapping region; and
generating respective shutter signals having respective pulse widths in a shutter phase to control exposure durations of the non-overlapping regions respectively according to the gain control signals.

5. The image processing method of claim 4, wherein during the enable phase, the capacitor of one of the non-overlapping regions discharges relatively faster and the capacitor of another one of the non-overlapping regions discharges relatively slower, and during the shutter phase, the step of generating respective shutter signals having respective pulse widths generates a shutter signal having a relatively shorter pulse width for the non-overlapping region whose capacitor discharges relatively faster and generates a shutter signal having a relatively longer pulse width for the non-overlapping region whose capacitor discharges relatively slower.

\* \* \* \* \*